Patented Nov. 26, 1940

2,222,867

UNITED STATES PATENT OFFICE 2,222,867

VULCANIZATION OF RUBBER

Sylvester M. Evans, Nitro, W. Va., assignor to Monsanto Chemical Company, St. Louis, Mo., a corporation of Delaware No Drawing. Application November 27, 1936, Serial No. 112,997

9 Claims. (Cl. 260—786)

The present invention relates to new vulcanization accelerators, to a process of vulcanizing rubber and to the vulcanized rubber product obtained with the aid of the said new accelerators.

In accordance with the present invention, it has been discovered that compounds possessing a structure of

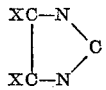

X representing hydrogen or hydrocarbon radicals, when incorporated in a rubber stock in conjunction with thiazole accelerators, produce an improved rubber product. More particularly it has been discovered that the compounds of this invention possess activating action when admixed with thiazole accelerators.

More particularly, the preferred class of accelerators of the present invention comprise compounds possessing a structure of

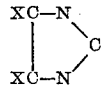

wherein X represents hydrogen or hydrocarbon radicals and wherein the carbon atom positioned between the two nitrogen atoms is attached to a sulfur atom.

The present invention embodies the use of compounds of the structural formula

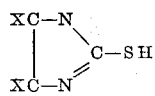

or their tautomeric structural formula

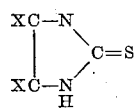

The preferred class of materials of the present invention possess the surprising property in that when employed alone in a rubber stock they are generally comparatively weak accelerators and in many cases exhibit no accelerating properties whatever, while the same materials, when admixed with a thiazole accelerator and incorporated in a typical rubber stock, are found to produce an improved rubber product and more particularly exhibit strong accelerating and activating properties.

As typical examples of the new class of materials which are employed with thiazole accelerators are 2-mercapto, 4-5 diphenyl glyoxaline possessing the formula of

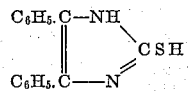

ethylene thiourea prepared by reacting ethylene diamine and carbon disulfide and possessing the formula of

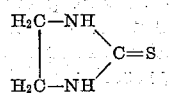

pinacolyl thiourea, prepared by reacting acetone, ammonia and carbon disulfide, and possessing the structural formula of

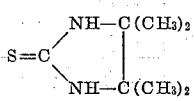

2-mercapto, 4-5 di-n-propyl glyoxalin and 2-mercapto, 4-5 di-isopropyl glyoxalin possessing the formulae

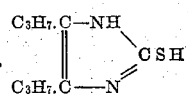

and 2-mercapto, 4-5 di-isobutyl glyoxalin.

As typical examples of thiazole accelerators, with which the preferred class of materials are admixed, are mercaptobenzothiazole, mercapto-tolylthiazole, mercaptonaphthothiazole, dibenzothiazyl disulfide, 2-mercapto, 4-phenyl benzothiazole, benzothiazyl thiobenzoate, 2,4 dinitrophenyl-benzothiazole and dibenzothiazyl-thioldimethylurea.

The following are to be understood as specific embodiments of the invention and in no sense limitative of the broad invention as embodied above.

A rubber stock was compounded in the well-known manner comprising

| | Parts |
|---|---|
| Pale crepe rubber | 100 |
| Zinc oxide | 5 |
| Sulfur | 3 |
| Stearic acid | 1 |
| Pinacolyl thiourea | 1 |

The rubber stock so compounded was vulcanized by heating in a press for varying periods of time at the temperature of 20 pounds of steam pressure per square inch and the vulcanized rubber stock found on testing to possess the following tensile and modulus properties:

Table I

| Cure time, mins. | Modulus of elasticity in lbs./in.² at elongations of— | | Tensile at break in lbs./in.² | Ult. elong., percent |
| --- | --- | --- | --- | --- |
| | 500% | 700% | | |
| 30 | 124 | 358 | 1270 | 925 |
| 45 | 166 | 611 | 1570 | 865 |
| 60 | 200 | 825 | 1830 | 850 |
| 90 | 246 | 1045 | 2060 | 825 |

As specific embodiments showing the use of the preferred class of materials with thiazole accelerators, stocks were compounded comprising

| | Stock A | Stock B | Stock C | Stock D |
| --- | --- | --- | --- | --- |
| Pale crepe rubber | 100 | 100 | 100 | 100 |
| Zinc oxide | 8 | 8 | 8 | 8 |
| Sulfur | 2.5 | 2.5 | 2.5 | 2.5 |
| Stearic acid | 0.5 | 0.5 | 0.5 | 0.5 |
| Pinacolyl thiourea | 0.3 | | 0.25 | |
| Benzothiazyl-thiobenzoate | 0.45 | 0.45 | | |
| Dibenzothiazyl-thiol-dimethyl-urea | | | 0.5 | 0.5 |

The stocks so compounded were cured by heating in a press for varying periods of time at the temperature of 20 pounds of steam pressure per square inch, and the cured rubber product tested with the following results:

Table II

| Stock | Cure time, mins. | Modulus of elasticity in lbs./in.² at elongations of— | | Tensile at break in lbs./in.² | Ult. elong., percent |
| --- | --- | --- | --- | --- | --- |
| | | 500% | 700% | | |
| A | 30 | 422 | 1895 | 3510 | 820 |
| B | 30 | 58 | 118 | 375 | 940 |
| C | 30 | 387 | 1725 | 3460 | 830 |
| D | 30 | 84 | 203 | 823 | 1000 |
| A | 45 | 523 | 2380 | 4460 | 830 |
| B | 45 | 107 | 275 | 849 | 915 |
| C | 45 | 509 | 2340 | 4180 | 815 |
| D | 45 | 162 | 462 | 1375 | 925 |
| A | 60 | 628 | 2955 | 4350 | 790 |
| B | 60 | 142 | 382 | 1180 | 915 |
| C | 60 | 609 | 2760 | 4340 | 805 |
| D | 60 | 226 | 698 | 1620 | 850 |
| A | 90 | 667 | 3050 | 4055 | 765 |
| B | 90 | 208 | 674 | 1810 | 875 |
| C | 90 | 703 | 3000 | 4075 | 770 |
| D | 90 | 291 | 1075 | 2190 | 840 |

From the above data it is shown that the preferred class of materials, for example pinacolyl thiourea, are exceptionally strong activators for thiazole accelerators.

As further embodiments of the present invention stocks were compounded comprising

| | Stock E | Stock F | Stock G | Stock H | Stock I |
| --- | --- | --- | --- | --- | --- |
| Pale crepe rubber | 100 | 100 | 100 | 100 | 100 |
| Zinc oxide | 8 | 8 | 8 | 8 | 8 |
| Sulfur | 2.5 | 2.5 | 2.5 | 2.5 | 2.5 |
| Stearic acid | 0.5 | 0.5 | 0.5 | 0.5 | 0.5 |
| 2-Mercapto, 4-5 diphenyl glyoxaline | 0.1 | | 1.0 | | |
| Dibenzothiazyl-thiol-dimethylurea | 0.6 | 0.6 | | | 0.6 |
| Ethylene thiourea | | 0.1 | | 1.0 | |

The stocks so compounded were vulcanized in a press at the temperature of 20 pounds steam pressure per square inch, and the following modulus and tensile properties obtained on testing the cured rubber product.

Table III

| Stock | Cure time, mins. | Modulus of elasticity in lbs./in.² at elongations of— | | Tensile at break in lbs./in.² | Ult. elong., percent |
| --- | --- | --- | --- | --- | --- |
| | | 500% | 700% | | |
| E | 30 | 112 | 324 | 1405 | 995 |
| F | 30 | 185 | 638 | 1775 | 890 |
| G | 30 | No cure | | | |
| H | 30 | 162 | 535 | 1780 | 930 |
| I | 30 | No cure | | | |
| E | 45 | 175 | 648 | 2075 | 910 |
| F | 45 | 247 | 928 | 2335 | 890 |
| G | 45 | No cure | | | |
| H | 45 | 269 | 948 | 2320 | 870 |
| I | 45 | 102 | 204 | 765 | 955 |
| E | 60 | 222 | 846 | 2560 | 900 |
| F | 60 | 287 | 1230 | 2890 | 850 |
| G | 60 | No cure | | | |
| H | 60 | 306 | 1195 | 2360 | 835 |
| I | 60 | 147 | 378 | 1235 | 910 |
| E | 90 | 299 | 1165 | 2840 | 860 |
| F | 90 | 399 | 1645 | 3210 | 825 |
| G | 90 | 76 | 167 | 288 | 880 |
| H | 90 | 414 | 1540 | 2600 | 800 |
| I | 90 | 249 | 734 | 1610 | 855 |

As still further specific embodiments of the invention stocks were compounded comprising

| | Stock J | Stock K | Stock L |
| --- | --- | --- | --- |
| Pale crepe rubber | 100 | 100 | 100 |
| Zinc oxide | 5 | 5 | 5 |
| Sulfur | 3 | 3 | 3 |
| Stearic acid | 1 | 1 | 1 |
| Ethylene thiourea | 0.1 | 1.0 | |
| Mercaptobenzothiazole | 0.6 | | 0.6 |

The compounded stocks were cured by heating in a press for varying periods of time at the temperature of 20 pounds of steam pressure per square inch and the cured stock tested with the following results:

Table IV

| Stock | Cure time, mins. | Modulus of elasticity in lbs./in.² at elongations of— | | Tensile at break in lbs./in.² | Ult. elong., percent |
| --- | --- | --- | --- | --- | --- |
| | | 500% | 700% | | |
| J | 30 | 226 | 815 | 1975 | 875 |
| K | 30 | 217 | 711 | 1935 | 920 |
| L | 30 | 143 | 405 | 1465 | 945 |
| J | 60 | 444 | 1745 | 2590 | 760 |
| K | 60 | 340 | 1318 | 2305 | 810 |
| L | 60 | 313 | 1058 | 2400 | 850 |
| J | 90 | 533 | 2080 | 3010 | 760 |
| K | 90 | 471 | 1910 | 2790 | 750 |
| L | 90 | 410 | 1480 | 2600 | 810 |

An examination of the above data shows that the preferred class of materials produce an improved rubber product and more particularly possess marked activating properties when employed in conjunction with a thiazole accelerator.

The present invention is not limited to the specific examples hereinbefore set forth wherein the preferred accelerators are employed. Other ratios of the compounding ingredients than those mentioned in the examples, as well as other well-known fillers, pigments and the like may be employed in the production of various types of rubber compounds, and are apparent to those to whom the invention pertains. The present invention is limited solely by the following claims.

What is claimed is:

1. The process of vulcanizing rubber which comprises heating rubber and sulfur in the presence of a mixture of dibenzothiazyl-thiol-dimethyl-urea and pinacolyl thiourea.

2. The process of vulcanizing rubber which comprises heating rubber and sulfur in the presence of a mixture of benzothiazyl-thiobenzoate and pinacolyl thiourea.

3. The process of vulcanizing rubber which comprises heating rubber and sulfur in the presence of a mixture of dibenzothiazyl-thiol-dimethyl-urea and ethylene thiourea.

4. The vulcanized rubber product obtained by heating rubber and sulfur in the presence of a mixture of dibenzothiazyl-thiol-dimethyl-urea and pinacolyl thiourea.

5. The vulcanized rubber product obtained by heating rubber and sulfur in the presence of a mixture of benzothiazyl-thiobenzoate and pinacolyl thiourea.

6. The vulcanized rubber product obtained by heating rubber and sulfur in the presence of a mixture of dibenzothiazyl-thiol-dimethyl-urea and ethylene thiourea.

7. The process of vulcanizing rubber which comprises heating rubber and sulfur in the presence of a mixture of a thiazole accelerator and a compound selected from the group consisting of thioglyoxalines and reduced thioglyoxalines wherein the atoms of the thioglyoxaline ring are members of a single ring system containing two nitrogen atoms and three carbon atoms, one of which carbon atoms is positioned between and joined to the nitrogen atoms and is additionally linked to a sulfur atom, the valences remaining on the two ring nitrogen atoms and on the sulfur linked to the interposed carbon atoms being satisfied by two hydrogen atoms and the valences remaining on the vicinal carbon atoms being satisfied by members of the group consisting of hydrogen and hydrocarbon radicals.

8. The process of vulcanizing rubber which comprises heating rubber and sulfur in the presence of a mixture of an arylene thiazole accelerator and a compound selected from the group consisting of thioglyoxalines and reduced thioglyoxalines wherein the atoms of the thioglyoxaline ring are members of a single ring system containing two nitrogen atoms and three carbon atoms, one of which carbon atoms is positioned between and joined to the nitrogen atoms and is additionally linked to a sulfur atom, the valences remaining on the two ring nitrogen atoms and on the sulfur linked to the interposed carbon atoms being satisfied by two hydrogen atoms and the valences remaining on the vicinal carbon atoms being satisfied by members of the group consisting of hydrogen and hydrocarbon radicals.

9. The process of vulcanizing rubber which comprises heating rubber and sulfur in the presence of an arylenethiazole accelerator and pinacolyl thiourea.

SYLVESTER M. EVANS.